(12) United States Patent
Augustine

(10) Patent No.: US 8,378,783 B1
(45) Date of Patent: Feb. 19, 2013

(54) REMOTE CONTROL SYSTEMS

(76) Inventor: Andrew L. Augustine, Chandler, AZ (US)

( * ) Notice: Subject to any disclaimer, the term of this patent is extended or adjusted under 35 U.S.C. 154(b) by 485 days.

(21) Appl. No.: 12/764,851

(22) Filed: Apr. 21, 2010

Related U.S. Application Data

(63) Continuation-in-part of application No. 11/425,672, filed on Jun. 21, 2006, now abandoned.

(60) Provisional application No. 60/745,259, filed on Apr. 20, 2006, provisional application No. 60/693,269, filed on Jun. 22, 2005.

(51) Int. Cl.
*G05B 19/02* (2006.01)
*H04B 1/03* (2006.01)

(52) U.S. Cl. .............. 340/5.64; 340/5.71; 340/12.5

(58) Field of Classification Search .............. 340/5.61, 340/5.64, 5.7, 5.71, 426.13, 426.16, 12.22, 340/12.5, 13.24, 13.25, 4.11; 341/176
See application file for complete search history.

(56) References Cited

U.S. PATENT DOCUMENTS

| | | | |
|---|---|---|---|
| 1,838,808 A | 12/1931 | Conant | |
| 2,914,709 A | 11/1959 | Rabinow | |
| 3,683,379 A | 8/1972 | Saddler et al. | |
| 4,223,301 A | 9/1980 | Grimes et al. | |
| 4,241,870 A | 12/1980 | Marcus | |
| 4,272,687 A | 6/1981 | Borkan | |
| 4,286,262 A | 8/1981 | Wahl | |
| 4,365,250 A | 12/1982 | Matsuoka et al. | |
| 4,731,605 A | 3/1988 | Nixon | |
| 4,847,601 A * | 7/1989 | Conti | 341/176 |
| 4,851,813 A | 7/1989 | Gottlieb | |
| 4,903,007 A | 2/1990 | Gottlieb | |
| 5,140,171 A | 8/1992 | de Janasz | |
| 5,184,132 A | 2/1993 | Baird | |
| 5,457,442 A | 10/1995 | Lucero | |
| 5,748,101 A | 5/1998 | Christensen et al. | |
| 5,794,719 A | 8/1998 | Holloway | |
| 5,898,397 A | 4/1999 | Murray | |
| D415,734 S | 10/1999 | Pomales | |
| 6,072,404 A | 6/2000 | Nolan et al. | |
| 6,078,271 A | 6/2000 | Roddy et al. | |
| RE38,069 E | 4/2003 | Posa | |
| 6,563,431 B1 | 5/2003 | Miller, Jr. | |
| 6,566,998 B1 | 5/2003 | Facory | |
| 6,588,297 B1 | 7/2003 | Day et al. | |
| 6,661,350 B1 | 12/2003 | Rohrberg et al. | |
| 7,079,808 B2 | 7/2006 | Striemer | |
| 7,084,570 B2 | 8/2006 | Oyaski | |
| 7,161,782 B2 * | 1/2007 | Juntunen et al. | 361/93.2 |
| 7,359,773 B2 * | 4/2008 | Simon et al. | 701/2 |
| 7,962,299 B2 * | 6/2011 | Robertson et al. | 702/62 |
| 2002/0121971 A1 | 9/2002 | Konno | |
| 2005/0035856 A1 | 2/2005 | McMahon | |
| 2005/0057340 A1 | 3/2005 | Fitzgibbon | |

* cited by examiner

*Primary Examiner* — George Bugg
*Assistant Examiner* — Anne Lai
(74) *Attorney, Agent, or Firm* — Stoneman Law Patent Group; Martin L. Stoneman

(57) ABSTRACT

A system that allows a user to install a remote control transmitter to transmit a control signal in response to the driver flashing the high-beam headlights in a vehicle without cutting and splicing wires in the vehicle electrical system. Pluggable light system components such as the light bulb housing, the light bulb socket, and/or the headlight fuse are structured and arranged to contain a radio frequency transmitter that draws power from the existing electrical circuits. A method of use is also disclosed.

20 Claims, 14 Drawing Sheets

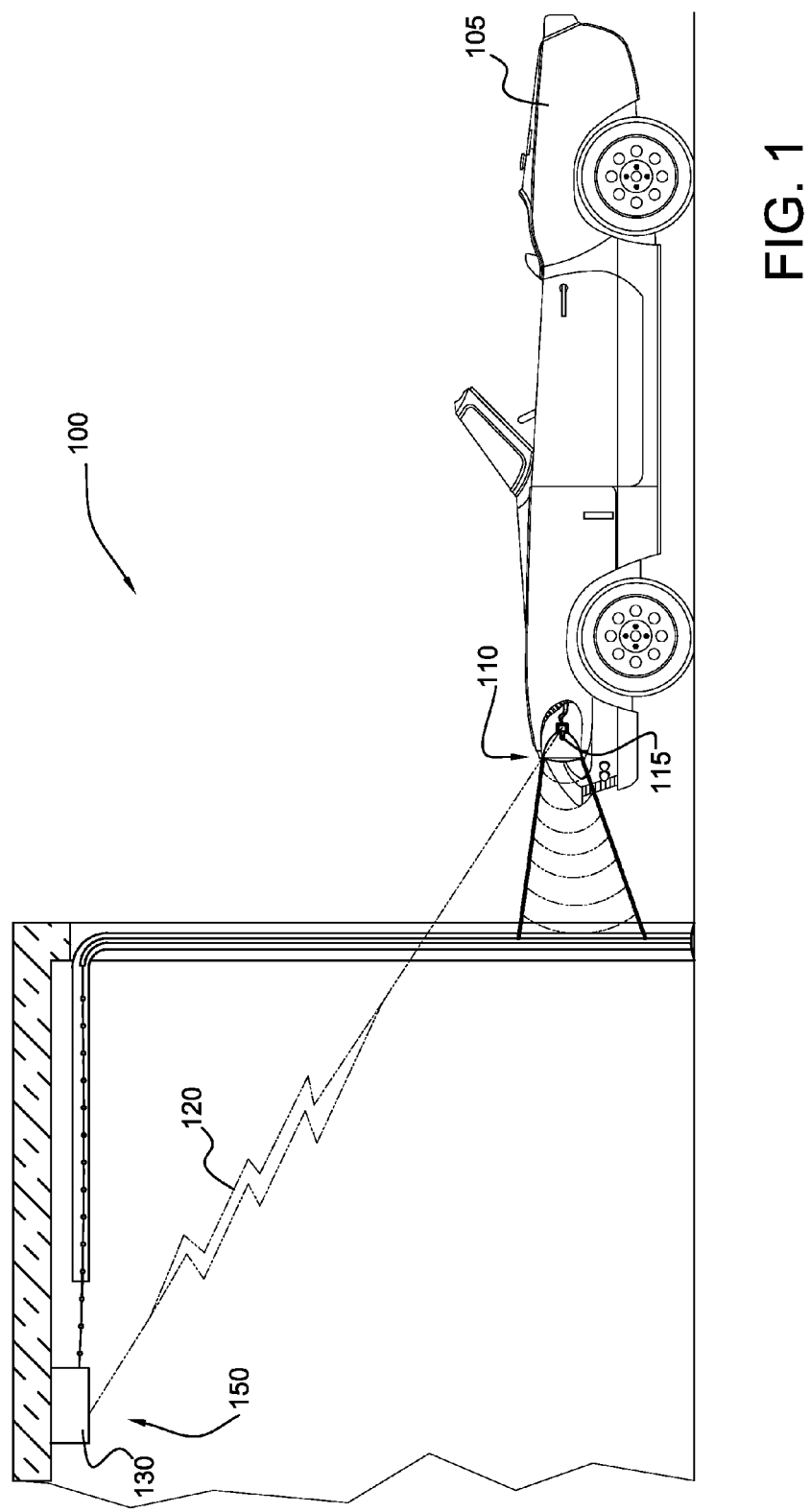

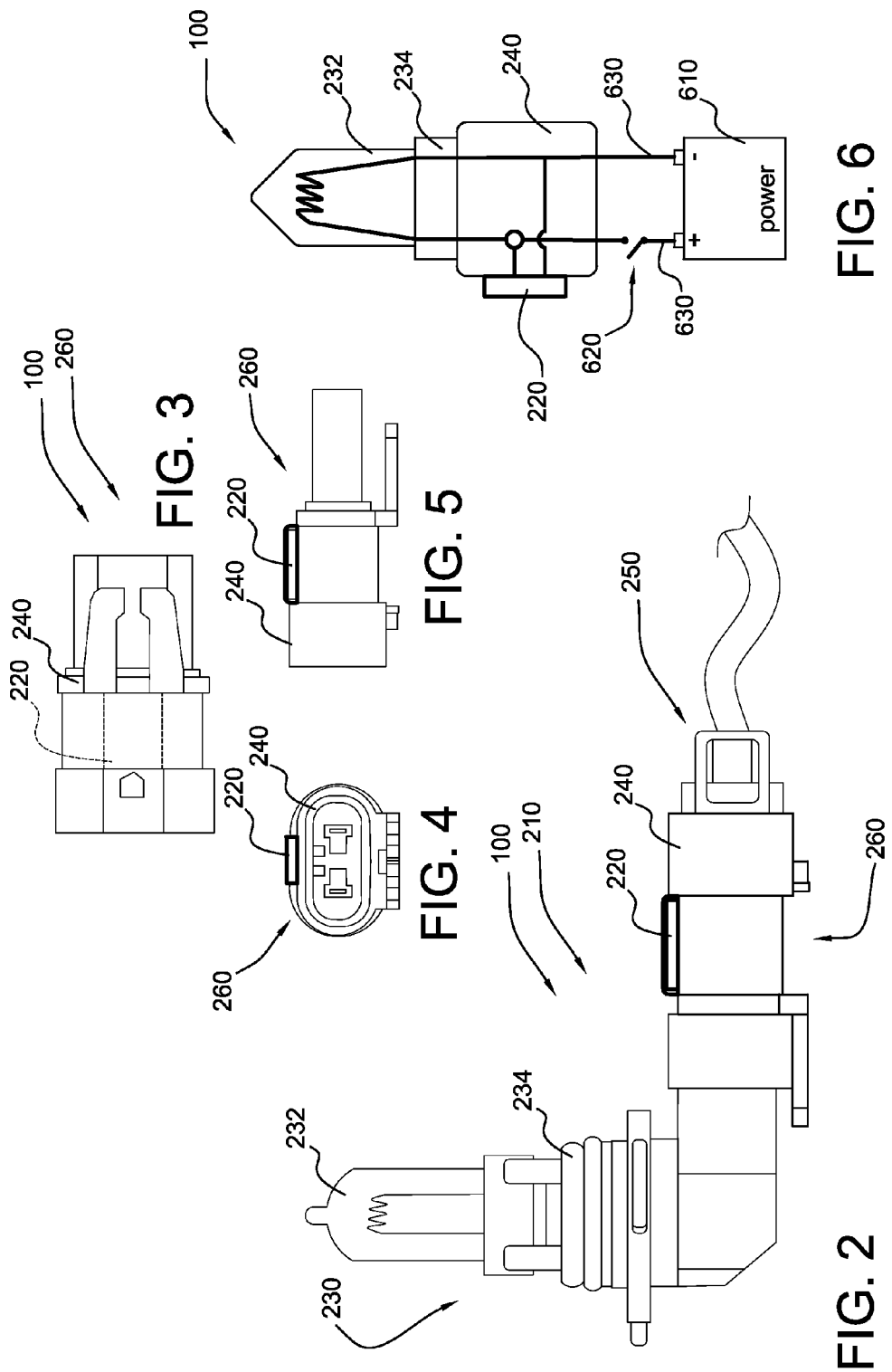

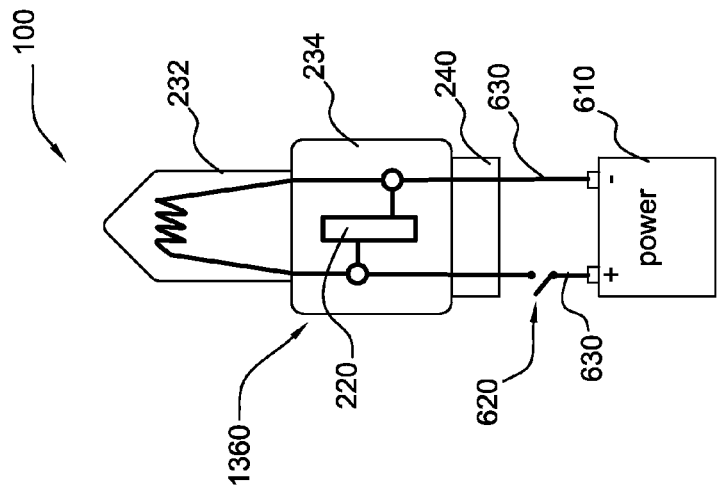
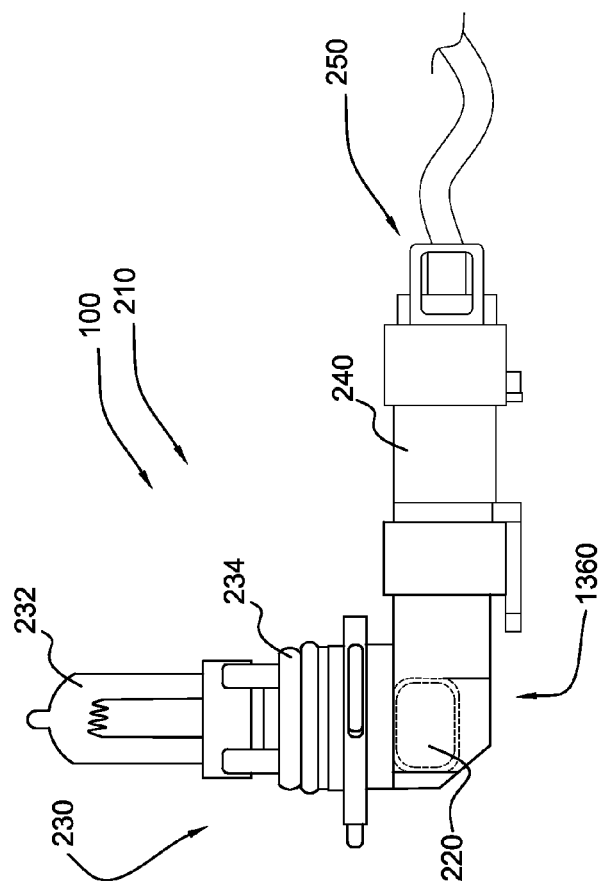

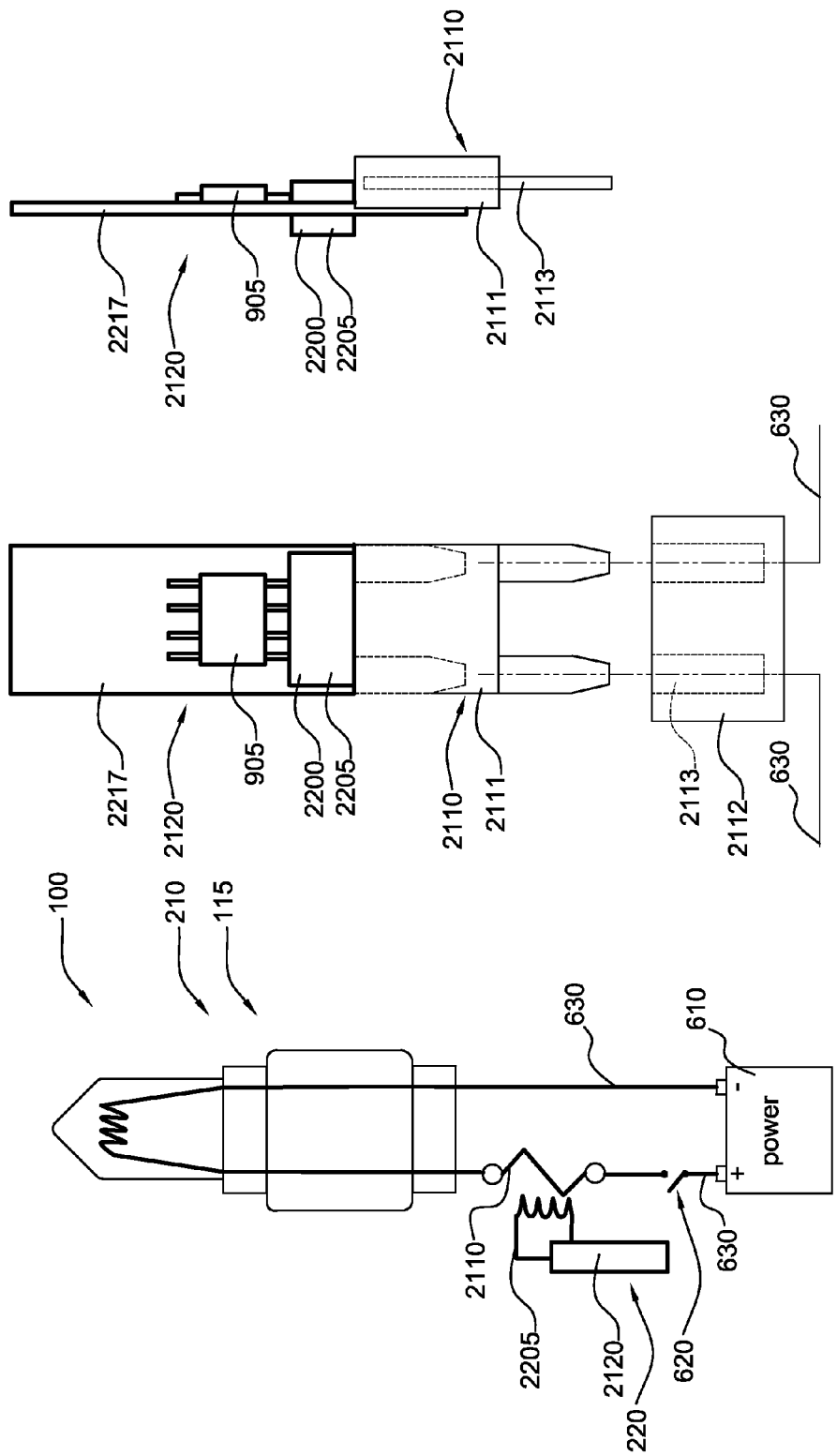

REMOTE CONTROL SYSTEMS

CROSS-REFERENCE TO RELATED APPLICATION

The present application is a continuation-in-part of patent application Ser. No. 11/425,672, filed Jun. 21, 2006, entitled "REMOTE CONTROL SYSTEMS", which is related to and claims priority from prior Provisional Patent Application Ser. No. 60/693,269, filed Jun. 22, 2005, entitled "REMOTE CONTROL SYSTEMS", and is also related to and claims priority from prior Provisional Patent Application Ser. No. 60/745,259, filed Apr. 20, 2006, entitled "REMOTE CONTROL SYSTEMS" the contents of all of which are incorporated herein by this reference and are not admitted to be prior art with respect to the present invention by the mention in this cross-reference section.

BACKGROUND

This invention relates to providing a system for improved remote controls. More particularly this invention relates to providing a system for remote control transmitters embedded in replaceable vehicle components that are powered only during use.

Typically, vehicle gate (garages, gates) and other conveniences are automatically controlled in response to a signal, particularly a coded radio frequency signal.

Presently, no system exists that allows a user to install a remote control transmitter in a vehicle, powered by the vehicle electrical system, without cutting and splicing wires in the vehicle electrical system. Presently, no system exists for quickly and easily adapting a vehicle to transmit a control signal in response to the driver flashing the high-beam headlights without cutting and splicing wires in the vehicle electrical system.

Therefore, a need exists for a system that allows a user to install a remote control transmitter in a vehicle, powered by the vehicle electrical system, without cutting and splicing wires in the vehicle electrical system. Further, a need exists for a system that allows a user to quickly and easily adapt a vehicle to transmit a control signal in response to the driver flashing the high-beam headlights without cutting and splicing wires in the vehicle electrical system.

OBJECTS AND FEATURES OF THE INVENTION

It is a primary object and feature of the present invention to provide improved remote control systems. Another primary object and feature of the present invention is to provide a system that allows a user to install a remote control transmitter, powered by the vehicle electrical system, without cutting and splicing wires in the vehicle electrical system. It is a further object and feature of the present invention to provide such a system that allows a user to quickly and easily adapt a vehicle to transmit a control signal in response to the driver flashing the high-beam headlights without cutting and splicing wires in the vehicle electrical system.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a remote control system, relating to remote operation of at least one vehicle gate for at least one vehicle to drive through, comprising: at least one automotive fuse housing insertable into at least one electrical fuse-box socket of at least one vehicle; wherein such at least one automotive fuse housing comprises at least one vehicle gate operator transmitter to transmit at least one coded radio frequency signal to remotely control operation of at least one vehicle gate, at least one automotive fuse, and at least one electrical contact blade; wherein such at least one vehicle gate operator transmitter is structured and arranged to draw electrical power from such at least one automotive fuse when electrical power is applied to such at least one automotive fuse; and wherein such at least one vehicle gate operator transmitter is triggered to transmit such at least one coded radio frequency signal by modulation of electrical power supplied to such at least one automotive fuse. Moreover, it provides such a remote control system, further comprising at least one vehicle electric light circuit. Additionally, it provides such a remote control system, wherein such at least one automotive fuse is in electrical connection with such at least one vehicle electric light circuit. Also, it provides such a remote control system, wherein such at least one vehicle electric light circuit comprises at least one vehicle high-beam headlight circuit. In addition, it provides such a remote control system, wherein such at least one vehicle gate operator transmitter is supplied to such at least one automotive fuse housing via at least one adapter element. And, it provides such a remote control system, wherein such at least one automotive fuse housing comprises two electrical contact blades. Further, it provides such a remote control system, wherein such at least one vehicle gate operator transmitter remotely operates at least one garage door.

In accordance with another preferred embodiment hereof, this invention provides a method comprising the steps of: unplugging at least one automotive fuse from at least one electrical fuse-box socket of at least one vehicle; plugging at least one automotive fuse comprising at least one vehicle gate operator transmitter into such at least one electrical fuse-box socket; and triggering operation of such at least one vehicle gate operator transmitter by powering at least one electric light circuit of such at least one vehicle. Even further, it provides such a method, further comprising the step of programming such at least one vehicle gate operator transmitter to operate with at least one particular vehicle gate. Even further, it provides such a method, wherein such triggering step occurs in response to at least one pattern of powering such at least one electric light circuit of such at least one vehicle. Even further, it provides such a method, wherein triggering operation of such at least one vehicle gate operator occurs by powering at least one vehicle high-beam headlight circuit.

In accordance with another preferred embodiment hereof, this invention provides a vehicle comprising: at least one automotive fuse connected with at least one electrical fuse-box socket of such vehicle; wherein such at least one automotive fuse comprises at least one vehicle gate operator transmitter to transmit at least one coded radio frequency signal to remotely control at least one vehicle gate, at least one fuse, and at least one electrical contact blade; wherein such at least one vehicle gate operator transmitter is structured and arranged to draw electrical power from such at least one automotive fuse when electrical power is applied to such at least one automotive fuse; and wherein such at least one vehicle gate operator transmitter is triggered to transmit such at least one coded radio frequency signal by modulation of electrical power supplied to such at least one automotive fuse. Even further, it provides such a vehicle, wherein such at least one automotive fuse is in electrical connection with at least one vehicle electric light circuit. Even further, it provides such a vehicle, wherein such at least one vehicle electric light circuit comprises at least one vehicle high-beam headlight circuit. Even further, it provides such a vehicle, wherein such at least one vehicle gate operator transmitter is supplied to such at least one automotive fuse via at least one adapter element. Even further, it provides such a vehicle, wherein such at least one automotive fuse comprises two electrical contact blades. Even further, it provides such a vehicle, wherein such at least one vehicle gate operator transmitter remotely operates at least one garage door. Even further, it provides such a vehicle, wherein such vehicle has at least two wheels. Even further, it provides such a vehicle, wherein such vehicle has at least four wheels. Even further, it provides such a vehicle, wherein such vehicle has four or more wheels.

In accordance with a preferred embodiment hereof, this invention provides a vehicle remote control system, relating to at least one vehicle, comprising: at least one electric light assembly wherein such at least one electric light assembly comprises at least one bulb assembly; and at least one electrical socket structured and arranged to provide electrical power to such at least one bulb assembly; wherein such at least one electric light assembly comprises at least one transmitter structured and arranged to transmit at least one coded radio frequency signal.

Moreover, it provides such a vehicle remote control system, wherein such at least one electric light assembly further comprises at least one adapter structured and arranged to provide at least one adapter between such at least one bulb assembly and such at least one electrical socket. Additionally, it provides such a vehicle remote control system, wherein such at least one adapter comprises such at least one transmitter. Also, it provides such a vehicle remote control system, wherein such at least one transmitter is structured and arranged to draw electrical power from such at least one adapter. In addition, it provides such a vehicle remote control system, wherein such at least one electrical socket comprises such at least one transmitter. And, it provides such a vehicle remote control system, wherein such at least one transmitter is structured and arranged to draw electrical power from such at least one electrical socket.

Further, it provides such a vehicle remote control system, wherein such at least one bulb assembly comprises such at least one transmitter. Even further, it provides such a vehicle remote control system, wherein such at least one transmitter comprises at least one bulb filament. Moreover, it provides such a vehicle remote control system, wherein such at least one transmitter is structured and arranged to draw electrical power from such at least one bulb assembly. Additionally, it provides such a vehicle remote control system, wherein such at least one transmitter is triggered to transmit such at least one coded radio frequency signal by modulation of such electrical power supplied to such at least one electrical socket. Also, it provides such a vehicle remote control system, wherein such at least one electrical light assembly comprises at least one high-beam electrical light assembly. In addition, it provides such a vehicle remote control system, wherein such at least one transmitter comprises at least one garage door remote control.

In accordance with another preferred embodiment hereof, this invention provides a vehicle remote control system, relating to at least one vehicle comprising at least one electric light circuit, comprising: at least one plug-connected electrical component of such at least one electric light circuit; wherein such at least one plug-connected electrical component comprises at least one transmitter structured and arranged to transmit at least one coded radio frequency signal.

And, it provides such a vehicle remote control system, further comprising such at least one electric light circuit, wherein such at least one electric light circuit comprises at least one high-beam headlight circuit. Further, it provides such a vehicle remote control system, wherein such at least one plug-connected electrical component comprises at least one electrical socket. Even further, it provides such a vehicle remote control system, wherein such at least one plug-connected electrical component comprises at least one bulb assembly. Moreover, it provides such a vehicle remote control system, wherein such at least one plug-connected electrical component comprises at least one fuse. Additionally, it provides such a vehicle remote control system, wherein such at least one plug-connected electrical component comprises at least one adapter. Also, it provides such a vehicle remote control system, wherein such at least one transmitter comprises at least one garage door remote control.

In accordance with another preferred embodiment hereof, this invention provides a vehicle remote control system, relating to at least one vehicle comprising at least one electric light circuit comprising at least one direct electrical path between and including at least one vehicle battery and at least one light bulb, such exactly one direct electrical path comprising plug-connected electrical components, comprising the steps of: unplugging at least one plug-connected electrical component from such at least one electric light circuit; plugging at least one plug-connected electrical component comprising at least one radio frequency transmitter into such at least one electric light circuit; and triggering the operation of such at least one radio frequency transmitter by powering such at least one electric light circuit.

In addition, it provides such a vehicle remote control system, further comprising the step of programming such at least one radio frequency transmitter to transmit at least one coded radio frequency signal. And, it provides such a vehicle remote control system, further comprising the step of programming such at least one radio frequency transmitter to transmit at least one coded radio frequency signal in response to at least one pattern of powering of such at least one electric light circuit. Further, it provides such a vehicle remote control system, wherein such step of replacing at least one plug-connected electrical component with at least one plug-connected electrical component comprising at least one radio frequency transmitter comprises the step of replacing at least one electrical socket with at least one electrical socket comprising at least one radio frequency transmitter.

Even further, it provides such a vehicle remote control system, wherein such step of replacing at least one plug-connected electrical component with at least one plug-connected electrical component comprising at least one radio frequency transmitter comprises the step of replacing at least one bulb assembly with at least one bulb assembly comprising at least one radio frequency transmitter. Moreover, it provides such a vehicle remote control system, wherein such step of replacing at least one plug-connected electrical component with at least one plug-connected electrical component comprising at least one radio frequency transmitter comprises the step of replacing at least one fuse with at least one fuse comprising at least one radio frequency transmitter.

In accordance with another preferred embodiment hereof, this invention provides a vehicle remote control system, relating to at least one vehicle, comprising: at least one electric light assembly wherein such at least one electric light assembly comprises at least one fuse; and at least one electrical socket structured and arranged to provide electrical power to such at least one fuse; wherein such at least one electric light assembly comprises at least one transmitter structured and arranged to transmit at least one coded radio frequency signal.

Additionally, it provides such a vehicle remote control system, wherein such at least one electric light assembly further comprises at least one adapter structured and arranged to provide at least one adapter between such at least one fuse and such at least one electrical socket. Also, it provides such a vehicle remote control system, wherein such at least one adapter comprises such at least one transmitter. In addition, it provides such a vehicle remote control system, wherein such at least one transmitter is structured and arranged to draw electrical power from such at least one adapter. And, it provides such a vehicle remote control system, wherein such at least one transmitter is structured and arranged to draw electrical power from such at least one electrical socket.

Further, it provides such a vehicle remote control system, wherein such at least one fuse comprises such at least one transmitter. Even further, it provides such a vehicle remote control system, wherein such at least one transmitter is structured and arranged to draw electrical power from such at least one fuse. Moreover, it provides such a vehicle remote control system, wherein such at least one transmitter is triggered to transmit such at least one coded radio frequency signal by modulation of such electrical power supplied to such at least one electrical socket. Additionally, it provides such a vehicle remote control system, wherein such at least one electrical light assembly comprises at least one high-beam electrical light assembly. Also, it provides such a vehicle remote control system, wherein such at least one transmitter comprises at least one garage door remote control.

In accordance with another preferred embodiment hereof, this invention provides a vehicle remote control system, relating to at least one vehicle, comprising: electric light assembly means for providing at least one electric light assembly wherein such electric light assembly means comprises bulb assembly means for providing at least one assembled light bulb; and electrical socket means for providing at least one electrical socket structured and arranged to provide electrical power to such bulb assembly means; wherein such electric light assembly means comprises transmitter means for transmitting at least one coded radio frequency signal. In addition, it provides such a vehicle remote control system, wherein such electric light assembly means further comprises adapter means for providing at least one adapter between such bulb assembly means and such electrical socket means.

And, it provides such a vehicle remote control system, wherein such adapter means comprises such transmitter means. Further, it provides such a vehicle remote control system, wherein such transmitter means is structured and arranged to draw electrical power from such adapter means. Even further, it provides such a vehicle remote control system, wherein such electrical socket means comprises such transmitter means. Moreover, it provides such a vehicle remote control system, wherein such transmitter means is structured and arranged to draw electrical power from such electrical socket means. Additionally, it provides such a vehicle remote control system, wherein such bulb assembly means comprises such transmitter means. Also, it provides such a vehicle remote control system, wherein such transmitter means comprises at least one bulb filament. In addition, it provides such a vehicle remote control system, wherein such transmitter means is structured and arranged to draw electrical power from such bulb assembly means.

And, it provides such a vehicle remote control system, wherein such transmitter means is triggered to transmit such at least one coded radio frequency signal by modulation of such electrical power supplied to such electrical socket means. Further, it provides such a vehicle remote control system, wherein such electrical light assembly means comprises high-beam electrical light assembly means for providing at least one high-beam electric light. Even further, it provides such a vehicle remote control system, wherein such transmitter means comprises at least one garage door remote control.

In accordance with another preferred embodiment hereof, this invention provides a vehicle remote control system, relating to at least one vehicle comprising at least one electric light circuit, comprising: plug-connected electrical component means for providing at least one plug-connected electrical component of such at least one electric light circuit; wherein such plug-connected electrical component means comprises transmitter means for transmitting at least one coded radio frequency signal.

Even further, it provides such a vehicle remote control system, further comprising such at least one electric light circuit, wherein such at least one electric light circuit comprises at least one high-beam headlight circuit. Even further, it provides such a vehicle remote control system, wherein such at least one plug-connected electrical component means comprises at least one electrical socket. Even further, it provides such a vehicle remote control system, wherein such at least one plug-connected electrical component means comprises at least one bulb assembly. Even further, it provides such a vehicle remote control system, wherein such at least one plug-connected electrical component means comprises at least one adapter. Even further, it provides such a vehicle remote control system, wherein such transmitter means comprises at least one garage door remote control.

Even further, it provides each and every novel feature, element, combination, step and/or method disclosed or suggested by this patent application.

BRIEF DESCRIPTION OF THE DRAWINGS

FIG. 1 shows a cutaway side view illustrating a remote control system according to a preferred embodiment of the present invention.

FIG. 2 shows a side view illustrating the remote control system according to a preferred embodiment of the present invention.

FIG. 3 shows a bottom view illustrating the transmitter socket according to the preferred embodiment of FIG. 2.

FIG. 4 shows an end view of illustrating the transmitter socket according to the preferred embodiment of FIG. 2.

FIG. 5 shows a side view illustrating the transmitter socket according to the preferred embodiment of FIG. 2.

FIG. 6 shows a block diagram illustrating the remote control system according to the preferred embodiment of FIG. 2.

FIG. 13 shows a side view illustrating a modification of the remote control system according to a preferred embodiment of FIG. 11.

FIG. 14 shows a block diagram illustrating the remote control system according to the preferred embodiment of FIG. 13.

FIG. 21 shows a block diagram illustrating another remote control system according to a preferred embodiment of the present invention.

FIG. 22 shows a front view illustrating the remote control system according to the preferred embodiment of FIG. 21.

FIG. 23 shows a side view illustrating the remote control system according to the preferred embodiment of FIG. 21.

Figure 8:
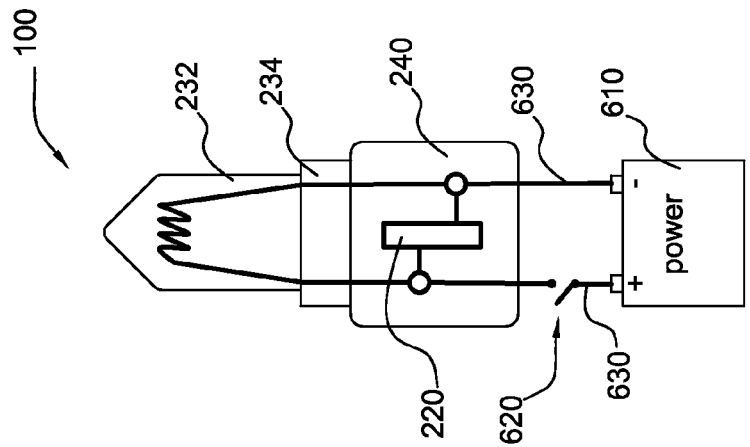
FIG. 8 shows a block diagram illustrating the remote control system according to the preferred embodiment of FIG. 7.

DETAILED DESCRIPTION OF THE BEST MODES AND PREFERRED EMBODIMENTS OF THE INVENTION

FIG. 1 shows a cutaway side view illustrating remote control system 100 according to a preferred embodiment of the present invention. Preferably, remote control system 100 is structured and arranged to transmit coded radio frequency (RF) signal 120 during the energizing of at least one lighting circuit 110 in at least one vehicle 105, as shown. More preferably, remote control system 100 is structured and arranged to transmit RF signal 120 during the energizing of high-beam light 115 in vehicle 105, as shown, more preferably to high-beam light 115 (at least embodying herein wherein such at least one electrical light assembly comprises at least one high-beam electrical light assembly structured and arranged to provide at least one high-beam electric light; and at least embodying herein wherein such electrical light assembly means comprises high-beam electrical light assembly means for providing at least one high-beam electric light) being flashed (powered on briefly and then turned off).

Preferably, RF signal 120 is detected by at least one RF receiving unit 150 preferably structured and arranged to initiate at least one remote operation, such as, for example the opening of a gate or door. In the preferred embodiment of FIG. 1, RF signal 120 triggers receiving unit 150, preferably automatic garage door opener 130, to open and/or close.

Upon reading the teachings of this specification, those with ordinary skill in the art will now understand that, under appropriate circumstances, considering such issues as advances in technology, user preference, etc., other arrangements, such as other electromagnetic frequencies, other remotely controllable RF receivers, other means of activating the transmitter, etc., may suffice.

FIG. 2 shows a side view illustrating light assembly 210 of remote control system 100 according to a preferred embodiment of the present invention. Preferably, remote control system 100 comprises light assembly 210 and transmitter 220, as shown. Preferably, light assembly 210 comprises both bulb assembly 230 and socket 240, as shown. Preferably, socket 240 is structured and arranged to connect bulb assembly 230 to wiring harness 250, as shown. Preferably, wiring harness 250 is wired into vehicle power supply 610 (as shown in FIG. 6), commonly supplying at least one 12 volt or 24 volt direct current. Preferably, vehicle power supply 610 comprises switch 620 (as shown in FIG. 6), which allows electricity to light assembly 210 to be turned on and off by the vehicle driver. Upon reading the teachings of this specification, those with ordinary skill in the art will now understand that, under appropriate circumstances, considering such issues as advances in technology, user preference, etc., other arrangements, such as the wiring harness connecting directly to the bulb assembly, other types of power supplies, etc., may suffice.

Preferably, bulb assembly 230 comprises lamp 232 and lamp housing 234, as shown. Preferably, bulb assembly 230 is a commercially available vehicle electrical light lamp, more preferably a signal light lamp, most preferably a high-beam headlight lamp, such as, for example, a HB3 high-beam headlight lamp, as shown. Upon reading the teachings of this specification, those with ordinary skill in the art will now understand that, under appropriate circumstances, considering such issues as advances in technology, user preference, etc., other types of lights, such as vehicle running lights, vehicle fog-lamps, other types of bulb assemblies such as household incandescent light bulbs, flashlight bulbs, etc., may suffice.

Preferably, socket 240 is structured and arranged to electrically connect wiring harness 250 to bulb assembly 230, as shown. Preferably, socket 240 is structured and arranged to electrically connect at least one particular type of bulb assembly 230 to at least one particular type of wiring harness 250. The type of wiring harness 250, socket 240, and bulb assembly 230 used in a particular vehicle 105 depends on the make and model of vehicle 105. Upon reading the teachings of this specification, those with ordinary skill in the art will now understand that, under appropriate circumstances, considering such issues as advances in technology, user preference, vehicle type, etc., other sockets, such as aftermarket socket upgrades, etc., may suffice.

Preferably, transmitter 220 comprises at least one radio frequency (RF) transmitter structured and arranged to transmit at least one RF signal 120, preferably at least one coded RF signal 120, such as, for example, a garage door remote control signal, as shown. Preferably, transmitter 220 is physically connected to and draws power from light assembly 210, as shown. More preferably, transmitter 220 is physically connected to and draws power from socket 240, as shown. Preferably, transmitter socket 260 comprises transmitter 220 (at least embodying herein wherein such at least one transmitter comprises at least one garage door remote control; and at least embodying herein wherein such transmitter means comprises at least one garage door remote control) physically and electrically coupled to socket 240, as shown. Upon reading the teachings of this specification, those with ordinary skill in the art will now understand that, under appropriate circumstances, considering such issues as advances in technology, user preference, etc., other arrangements, such as the transmitter having an independent power supply, etc., may suffice.

FIG. 3 shows a bottom view illustrating transmitter socket 260 according to the preferred embodiment of FIG. 2. Preferably, socket 240 is substantially similar in specification to standard commercially available sockets of the sort known in the art, such as, for example, standard HB3-type sockets, as shown. Preferably, transmitter 220 is structured and arranged to physically and electrically couple to socket 240 to form transmitter socket 260 (at least embodying herein wherein such at least one electrical socket comprises such at least one transmitter; and at least embodying herein wherein such electrical socket means comprises such transmitter means; and at least embodying herein wherein such at least one transmitter is structured and arranged to draw electrical power from such at least one electrical socket; and at least embodying herein wherein such transmitter means is structured and arranged to draw electrical power from such electrical socket means; and at least embodying herein wherein such at least one plug-connected electrical component comprises at least one transmitter structured and arranged to transmit at least one coded radio frequency signal; and at least embodying herein wherein such plug-connected electrical component means comprises transmitter means for transmitting at least one coded radio frequency signal), as shown. Preferably, transmitter socket 260 is installed in light assembly 210 by unplugging the old socket from bulb assembly 230 and wiring harness 250 and plugging transmitter socket 260 into bulb assembly 230 and wiring harness 250, as shown (at least embodying herein the step of replacing at least one electrical socket with at least one electrical socket comprising at least one radio frequency transmitter). Preferably, transmitter socket 260 is manufactured and sold to users who install transmitter socket 260 (at least embodying herein at least one plug-connected electrical component structured and arranged to provide at least one plug-connected electrical component of such at least one electric light circuit; and at least embodying herein plug-connected electrical component means for providing at least one plug-connected electrical component of such at least one electric light circuit) in their vehicles 105. In this way, the user may easily adapt their vehicle 105 to transmit at least one remote control signal 120 on demand, without any wire splicing, soldering, etc. being required. Upon reading the teachings of this specification, those with ordinary skill in the art will now understand that, under appropriate circumstances, considering such issues as advances in technology, user preference, etc., other transmitter socket arrangements, such as transmitter sockets being supplied as original vehicle equipment, etc., may suffice.

Preferably, when power is applied to transmitter socket 260 (at least embodying herein wherein such at least one plug-connected electrical component comprises at least one electrical socket; and at least embodying herein wherein such at least one plug-connected electrical component means comprises at least one electrical socket), transmitter 220 is activated and transmits a brief, coded, RF signal 120 structured and arranged to trigger action by an RF receiver such as, for example, automatic garage door opener 130, as shown in FIG. 1. Preferably, transmitter 220 is either pre-programmed or programmable to transmit a particular security code that matches the code of the receiver, including rolling security codes, as is further described in FIG. 9. Upon reading the teachings of this specification, those with ordinary skill in the art will now understand that, under appropriate circumstances, considering such issues as advances in technology, user preference, intended use, etc., other receivers, such as financial transaction code receivers such as toll road code receivers, other security codes, inventory codes, etc., may suffice.

FIG. 4 shows an end view illustrating transmitter socket 260 according to the preferred embodiment of FIG. 2.

FIG. 5 shows a side view illustrating transmitter socket 260 according to the preferred embodiment of FIG. 2.

FIG. 6 shows a block diagram illustrating remote control system 100 according to the preferred embodiment of FIG. 2. Preferably, remote control system 100 is electrically coupled to power supply 610, switch 620, and electrical connections 630, as shown (in alternate preferred embodiments of the present invention, remote control system 100 further comprises power supply 610, switch 620, and electrical connections 630). Preferably, switch 620 is a user-operable vehicle switch, preferably a pre-existing user-operable vehicle switch that is conveniently accessible to the vehicle operator, such as, for example, the high-beam headlight switch in vehicle 105. Preferably, the user rapidly switches switch 620 on and off one or more times to activate transmitter 220, simultaneously flashing lamp 232. Upon reading the teachings of this specification, those with ordinary skill in the art will now understand that, under appropriate circumstances, considering such issues as advances in technology, user preference, vehicle design, etc., other switches, such as dedicated switches, optical switches, vehicle remote controls, etc., may suffice.

Preferably, when switch 620 is closed, electricity flows into socket 240. Preferably, electricity then flows from socket 240 into transmitter 220, powering transmitter 220 and triggering transmitter 220 to transmit RF signal 120. Preferably, essentially simultaneously, electricity flows from socket 240 into lamp housing 234 and then into lamp 232, lighting lamp 232. Preferably, transmitter 220 is programmed to automatically transmit only a single burst of RF signal 120, even if power continues to flow into socket 240. A preferred circuit diagram corresponding to the block diagram of FIG. 6 is shown in FIG. 9.

Figure 7:
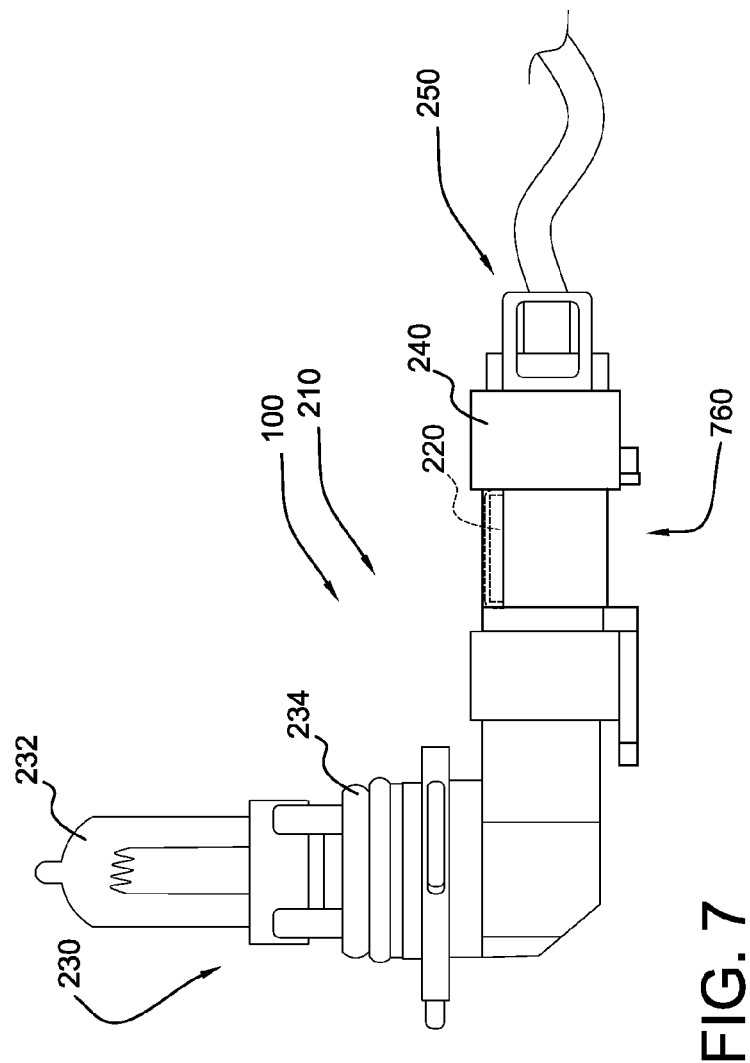
FIG. 7 shows a side view illustrating a modification of the remote control system according to another preferred embodiment of the present invention.

FIG. 7 shows a side view illustrating transmitter socket 760 of remote control system 100 according to the preferred embodiments of FIG. 2. Preferably, remote control system 100 comprises transmitter socket 760. Preferably, transmitter socket 760 comprises a modified positioning of transmitter 220 wherein transmitter 220 is placed (preferably manufactured) at least partially inside socket 240, as shown.

FIG. 8 shows a block diagram illustrating transmitter socket 760 of remote control system 100 according to the preferred embodiment of FIG. 7, showing transmitter 220 inside socket 240. A preferred circuit diagram corresponding to the block diagram of FIG. 8 is shown in FIG. 9.

Figure 9:
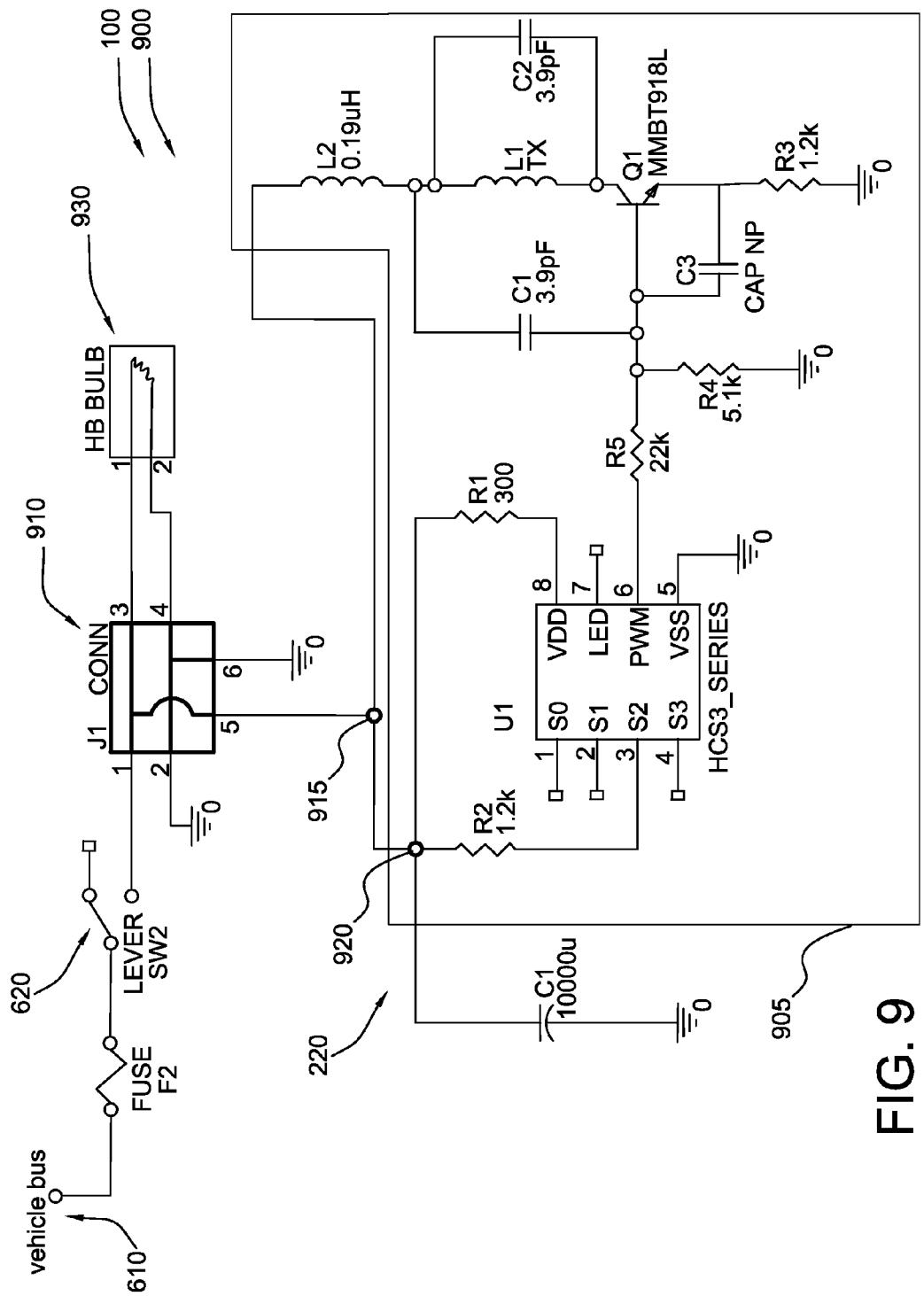
FIG. 9 shows a circuit diagram illustrating a preferred circuit according to the preferred embodiment of FIG. 2.

FIG. 9 shows a circuit diagram illustrating a preferred circuit 900 according to the preferred embodiments of FIG. 2. Preferably, remote control system 100 comprises circuit 900, as shown. Preferably, transmitter 220 comprises transmitter circuit 905, as shown. Preferably, bulb assembly 230 comprises lamp circuit 930, as shown. Preferably, circuit 900 (at least embodying herein at least one electric light circuit; and at least embodying herein wherein such at least one electric light circuit comprises at least one high-beam headlight circuit; and at least embodying herein wherein such at least one electric light circuit comprises at least one high-beam headlight circuit) comprises transmitter circuit 905, lamp circuit 930, power supply 610, and junction 910, as shown. Preferably, junction 910 electrically connects lamp circuit 930, power supply 610, and transmitter circuit 905, as shown.

Upon reading the teachings of this specification, those with ordinary skill in the art will now understand that, under appropriate circumstances, considering such issues as advances in technology, user preference, etc., other circuit components, such as visual indicators, audio indicators, heat sinks, independent power supplies, other transmitters, other receivers, etc., may suffice.

Preferably, transmitter circuit 905 is an RF transmitter circuit of the sort known in the art of garage door remote controls, such as, for example, a GENIE™ INTELLI-CODE™ garage door remote control circuit, as shown. Preferably, junction 910 receives electricity from power supply 610 and routes the electricity to lamp circuit 930 while simultaneously routing electricity to transmitter circuit 905 through electrical connection 915 (which preferably routes power via inductor L2 to drive transmitting antenna L1) and electrical connection 920. Electrical connection 920 preferably routes power to encoder U1, which is preferably an HCS3_Series encoder, most preferably an HCS301 code-hopping encoder manufactured by Microchip Technology Inc. of Chandler, Ariz., USA. Filter capacitor C1 (which is preferably optional), is preferably electrically coupled at electrical connection 920, and is preferably used to filter noise from the power input. Upon reading the teachings of this specification, those with ordinary skill in the art will now understand that, under appropriate circumstances, considering such issues as advances in technology, user preference, etc., other circuits, such as equivalent circuits using parts from other sources, different circuit designs having similar functions, dedicated integrated circuits, other garage door opener circuits, etc., may suffice.

Figure 10:
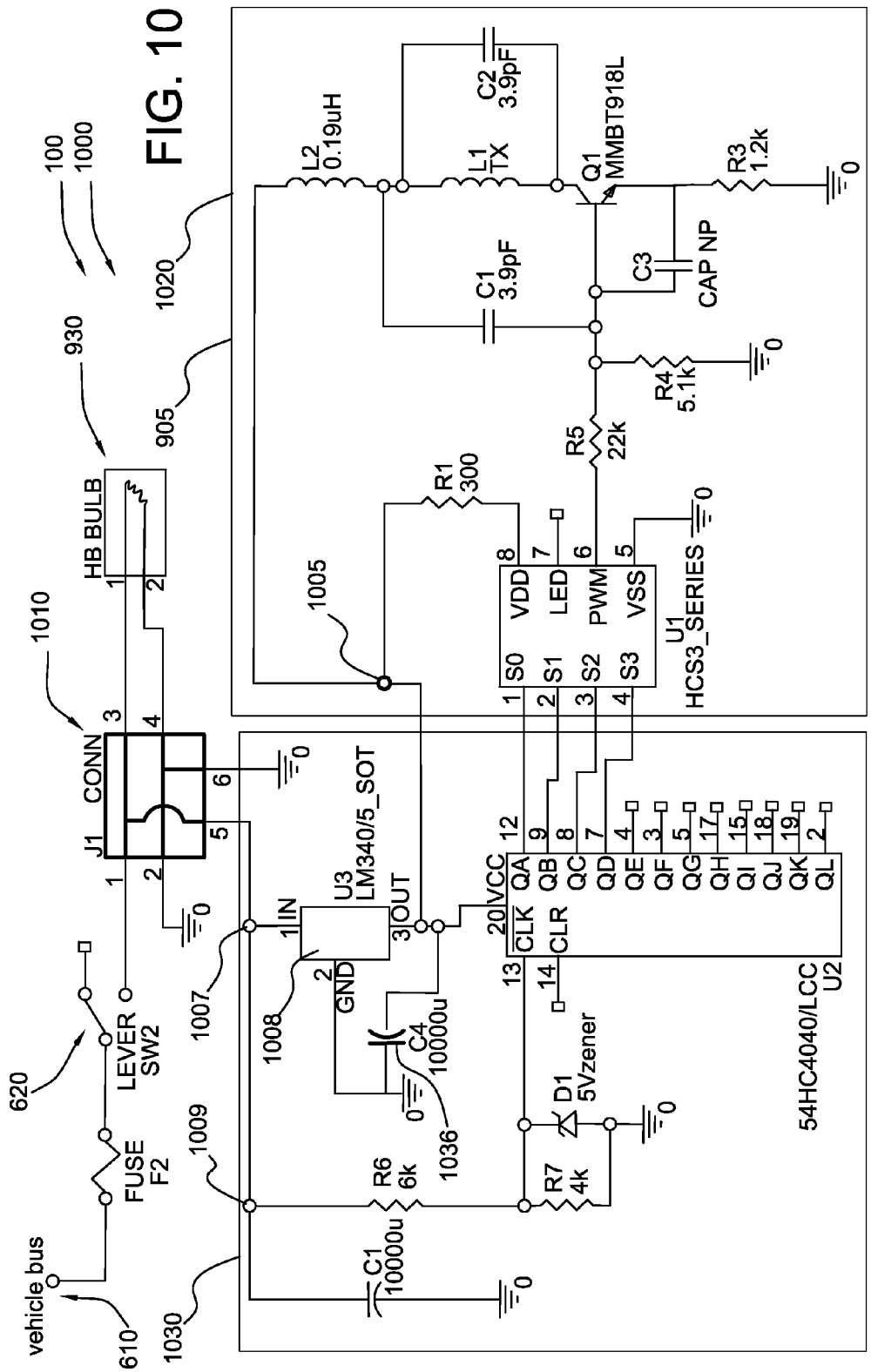
FIG. 10 shows a circuit diagram illustrating a modification of the preferred circuit according to FIG. 9.

FIG. 10 shows a circuit diagram illustrating a modification of the preferred circuit according to FIG. 9. Preferably, transmitter circuit 905 comprises transmitter circuit 1020 (at least embodying herein wherein such at least one transmitter is triggered to transmit such at least one coded radio frequency signal by modulation of such electrical power supplied to such at least one electrical socket; and at least embodying herein wherein such transmitter means is triggered to transmit such at least one coded radio frequency signal by modulation of such electrical power supplied to such electrical socket means), as shown, which is preferably modified to transmit at least one of multiple unique RF signals 120 in response to modulated patterns of electricity flowing through circuit 1000.

Preferably, circuit 1000 comprises transmitter circuit 905, lamp circuit 930, junction 1010, counter circuit 1030, and optionally power supply 610, as shown. Preferably, junction 1010 electrically connects lamp circuit 930, power supply 610, and counter circuit 1030, as shown. Preferably, junction 1010 routes power to counter circuit 1030 through electrical connection 1007, as shown. Preferably, electrical connection 1007 routes power through voltage regulator 1008 to electrical connection 1005 and on to transmitter circuit 905, as shown. Preferably, electrical connection 1007 also routes power through electrical connection 1009 to binary counter U2, which preferably comprises a 54HC4040 high-speed CMOS 12-stage binary counter, as shown. Preferably, capacitor 1036 is used to maintain operational power to binary counter U2 as switch 620 is switched rapidly on and off, thus enabling binary counter U2 to count the number of signals (switches) occurring in a space of time. Preferably, the signal "count" is advanced on a high-to-low transition at the clock (CLK) input pin 13, as shown. The results of the "count" are preferably used to select a preprogrammed coded signal 120 to be transmitted by transmitter circuit 905. FIG. 10 illustrates four outputs (QA through QD) of binary counter U2 preferably coupled to four inputs (S0 through S3) of encoder U1. Upon reading the teachings of this specification, those with ordinary skill in the art will now understand that, under appropriate circumstances, considering such issues as advances in technology, user preference, intended receiver, etc., other arrangements, such as equivalent circuits using parts from other sources, different circuit designs having similar functions, dedicated integrated circuits, other types of counter circuits, other types of signal selectors, etc., may suffice.

For example, circuit 1020 is structured and arranged to transmit (at least embodying herein the step of triggering the operation of such at least one radio frequency transmitter by powering such at least one electric light circuit) a first RF signal 120 when lamp 232 is turned on once (for example, to open a garage door), and to transmit (at least embodying herein the step of programming such at least one radio frequency transmitter to transmit at least one coded radio frequency signal in response to at least one pattern of powering of such at least one electric light circuit) a second RF signal 120 when lamp 232 is flashed twice in quick succession (for example, to open a gate and/or deactivate a security system).

Figure 11:
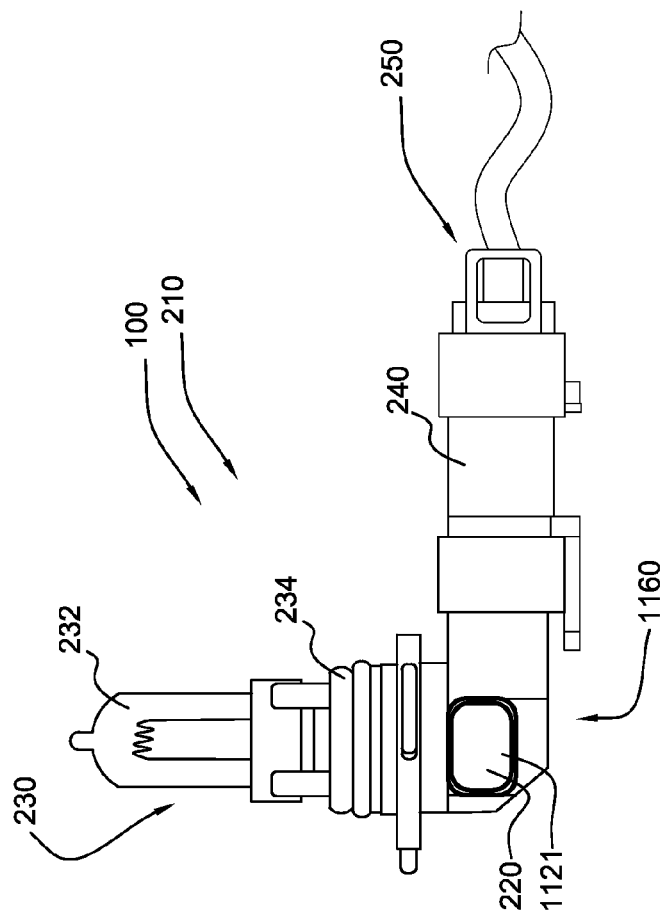
FIG. 11 shows a side view illustrating the remote control system according to another preferred embodiment of the present invention.

FIG. 11 shows a side view illustrating transmitter bulb assembly 1160 of remote control system 100 according to a preferred alternate embodiment of the present invention. In transmitter bulb assembly 1160, which is a modification of the preferred embodiments of FIG. 2, transmitter 220 is connected to and draws power from bulb assembly 230, as shown. Preferably, transmitter bulb assembly 1160 (at least embodying herein wherein such at least one transmitter is structured and arranged to draw electrical power from such at least one bulb assembly; and at least embodying herein wherein such transmitter means is structured and arranged to draw electrical power from such bulb assembly means) comprises transmitter 220 physically and electrically connected to bulb assembly 230, as shown. In this preferred embodiment, transmitter 220 is physically connected to the exterior of bulb assembly 230, as shown, preferably in protective housing 1121.

Preferably, transmitter bulb assembly 1160 (at least embodying herein wherein such at least one bulb assembly comprises such at least one transmitter; and at least embodying herein wherein such bulb assembly means comprises such transmitter means) is installed in light assembly 210 (at least embodying herein at least one electric light assembly structured and arranged to provide at least one electric light assembly; and at least embodying herein electric light assembly means for providing at least one electric light assembly) by unplugging (at least embodying herein the step of unplugging at least one plug-connected electrical component from such at least one electric light circuit) the old bulb assembly from socket 240 and plugging (at least embodying herein the step of plugging at least one plug-connected electrical component comprising at least one radio frequency transmitter into such at least one electric light circuit) transmitter bulb assembly 1160 (at least embodying herein wherein such at least one plug-connected electrical component comprises at least one bulb assembly; and at least embodying herein wherein such at least one plug-connected electrical component means comprises at least one bulb assembly) into socket 240, as shown (at least embodying herein the step of replacing at least one bulb assembly with at least one bulb assembly comprising at least one radio frequency transmitter). Preferably, transmitter bulb assembly 1160 is programmed (at least embodying herein the step of programming such at least one radio frequency transmitter to transmit at least one coded radio frequency signal) to transmit codes recognized by the receiver, preferably by the user, as is known in the art of garage remote controls (for example, by transmitting codes to the receiver while the receiver is set to learn new codes). In this way, a user may easily adapt their vehicle 105 to transmit a remote control signal 120 on demand, without any wire splicing being required, by replacing a part that is commonly intended to be user replaceable. Upon reading the teachings of this specification, those with ordinary skill in the art will now understand that, under appropriate circumstances, considering such issues as advances in technology, user preference, intended use, etc., other steps, such as using other programming methods, using transmitters with pre-programmed and/or unalterable codes, other necessary bulb-replacement steps, etc., may suffice.

Figure 12:
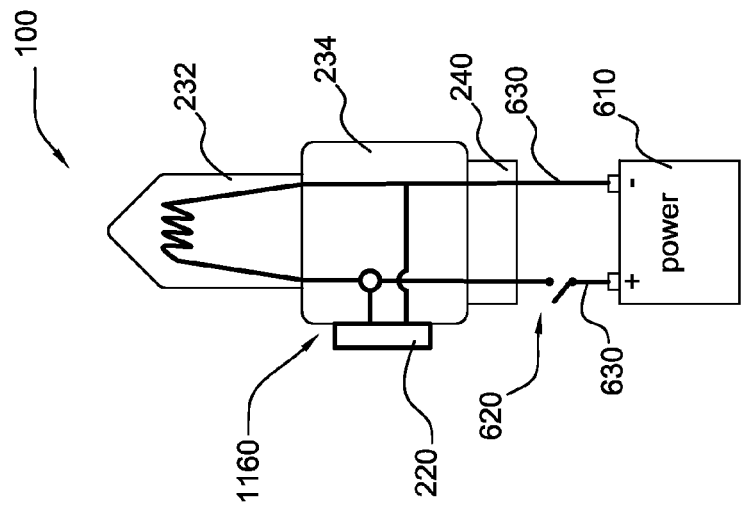
FIG. 12 shows a block diagram illustrating the remote control system according to the preferred embodiment of FIG. 11.

FIG. 12 shows a block diagram illustrating transmitter bulb assembly 1160 of remote control system 100 according to the preferred embodiment of FIG. 11. A preferred circuit diagram corresponding to this block diagram is shown in FIG. 15.

FIG. 13 shows a side view illustrating transmitter bulb assembly 1360 of remote control system according to an alternate preferred embodiment of the present invention. In this preferred embodiment, transmitter 220 is placed (preferably manufactured) at least partially inside bulb assembly 230 to form transmitter bulb assembly 1360, as shown.

FIG. 14 shows a block diagram illustrating transmitter bulb assembly 1360 of remote control system 100 according to the preferred embodiment of FIG. 13.

Figure 15:
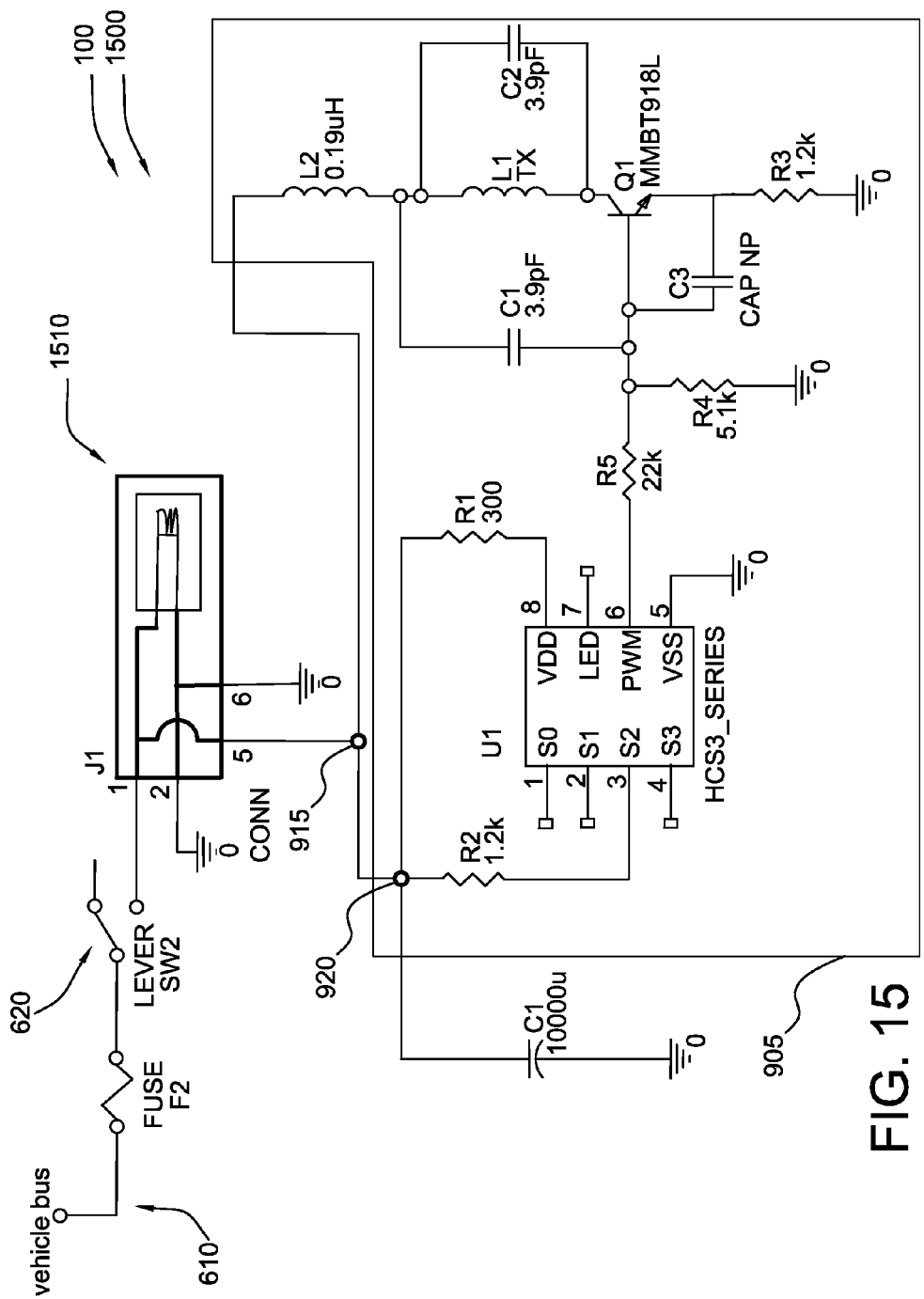
FIG. 15 shows a circuit diagram illustrating a modification of the preferred circuit according to FIG. 11.

FIG. 15 shows a circuit diagram illustrating circuit 1500, comprising a modification of the preferred circuit according to FIG. 11. Preferably, circuit 1500 of remote control system 100 is substantially similar to circuit 900 in FIG. 9, with a modification comprising the combining of lamp circuit 930 and junction 910 into lamp circuit 1510, as shown.

Figure 16:
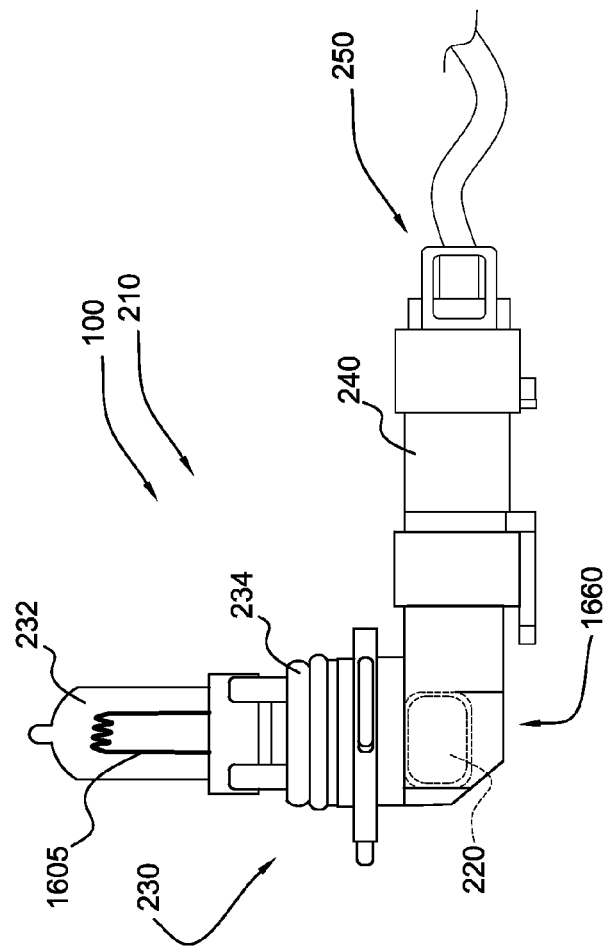
FIG. 16 shows a side view illustrating a modification of the remote control system according to a preferred embodiment of FIG. 13.

FIG. 16 shows a side view illustrating a modification of remote control system 100 according to another preferred embodiment of FIG. 13. In an alternate preferred embodiment transmitter bulb assembly 1360 comprises filament transmitter 1660, as shown, which is a modification of the preferred embodiment of FIG. 13, wherein transmitter 220 is structured and arranged to use filament 1605 as RF antenna 1600. Preferably, transmitter 220 comprises transmitter 1620 (at least embodying herein wherein such at least one transmitter comprises at least one bulb filament; and at least embodying herein wherein such transmitter means comprises at least one bulb filament) wherein transmitter 220 is inductively coupled to filament 1605.

Figure 17:
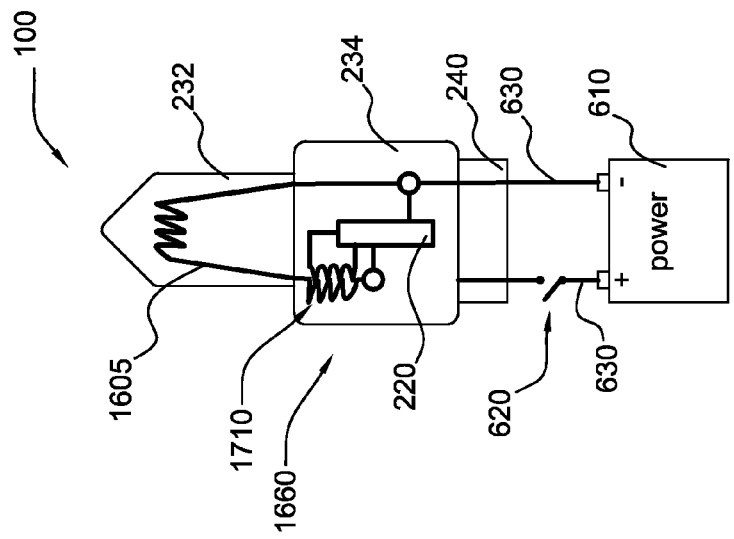
FIG. 17 shows a block diagram illustrating the remote control system according to the preferred embodiment of FIG. 16.

FIG. 17 shows a block diagram illustrating remote control system 100 according to the preferred embodiment of FIG. 16. Preferably, transmitter 220 is inductively coupled to filament 1605 with RF coupler 1710, as shown.

Figure 18:
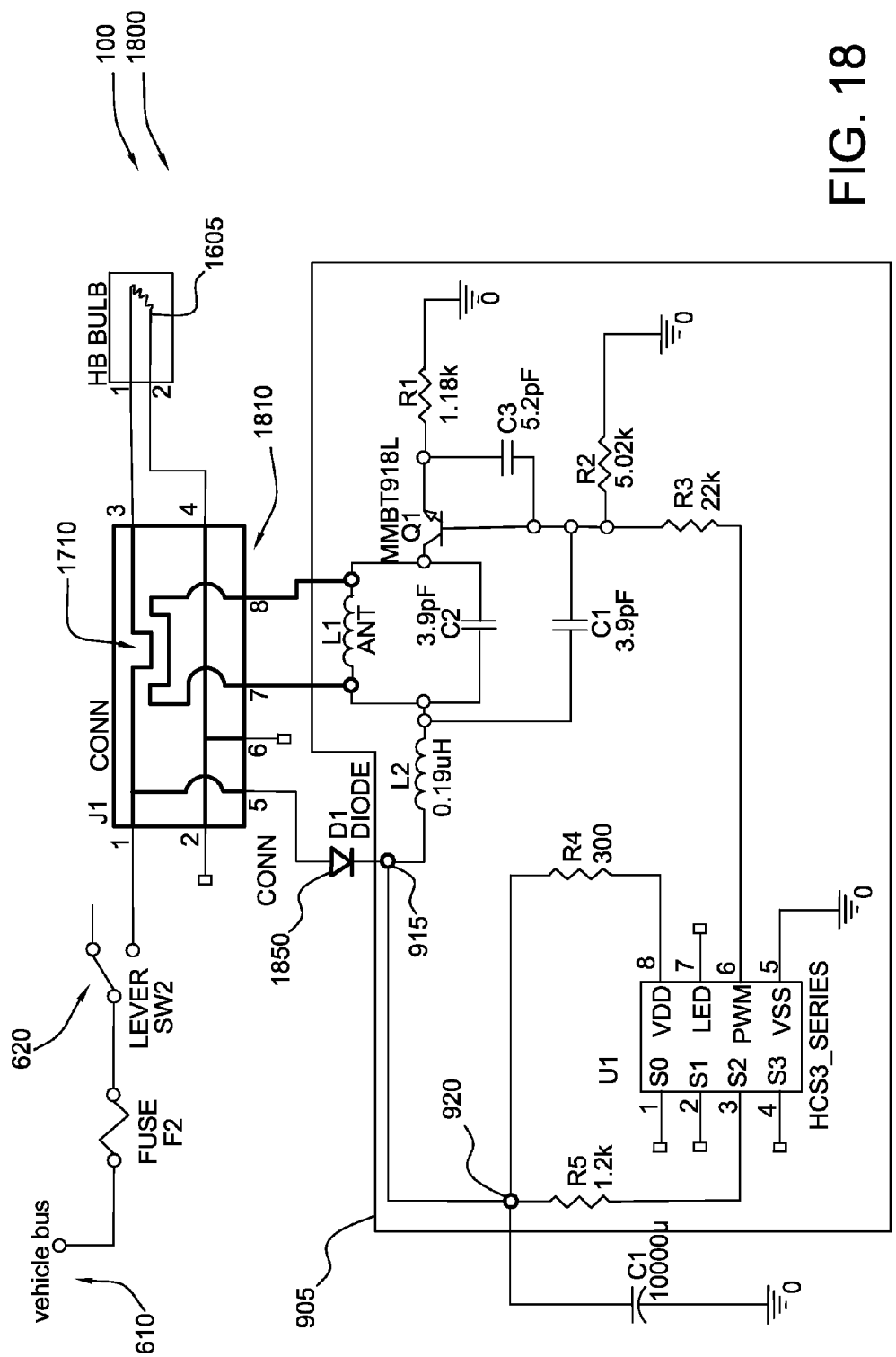
FIG. 18 shows a circuit diagram illustrating a modification of the preferred circuit according to FIG. 16.

FIG. 18 shows a circuit diagram illustrating circuit 1800. Preferably, remote control system 100 comprises circuit 1800, as shown. Preferably, circuit 1800 is substantially similar to circuit 900 in FIG. 9, modified such that transmitter L1 is inductively coupled to filament 1605 (via junction 1810) with RF coupler 1710, as shown. The use of RF couplers to couple RF circuits is well known to those of skill in the art. Preferably, diode D1 allows electricity to flow from junction 1810 to electrical connection 915 and prevents power from flowing from electrical connection 915 to junction 1810 (as may otherwise occur due to the action of RF coupler 1710). Upon reading the teachings of this specification, those with ordinary skill in the art will now understand that, under appropriate circumstances, considering such issues as advances in technology, user preference, etc., other circuit components, such as visual indicators, audio indicators, heat sinks, independent power supplies, other transmitters, other receivers, etc., may suffice.

Figures 19, 20:
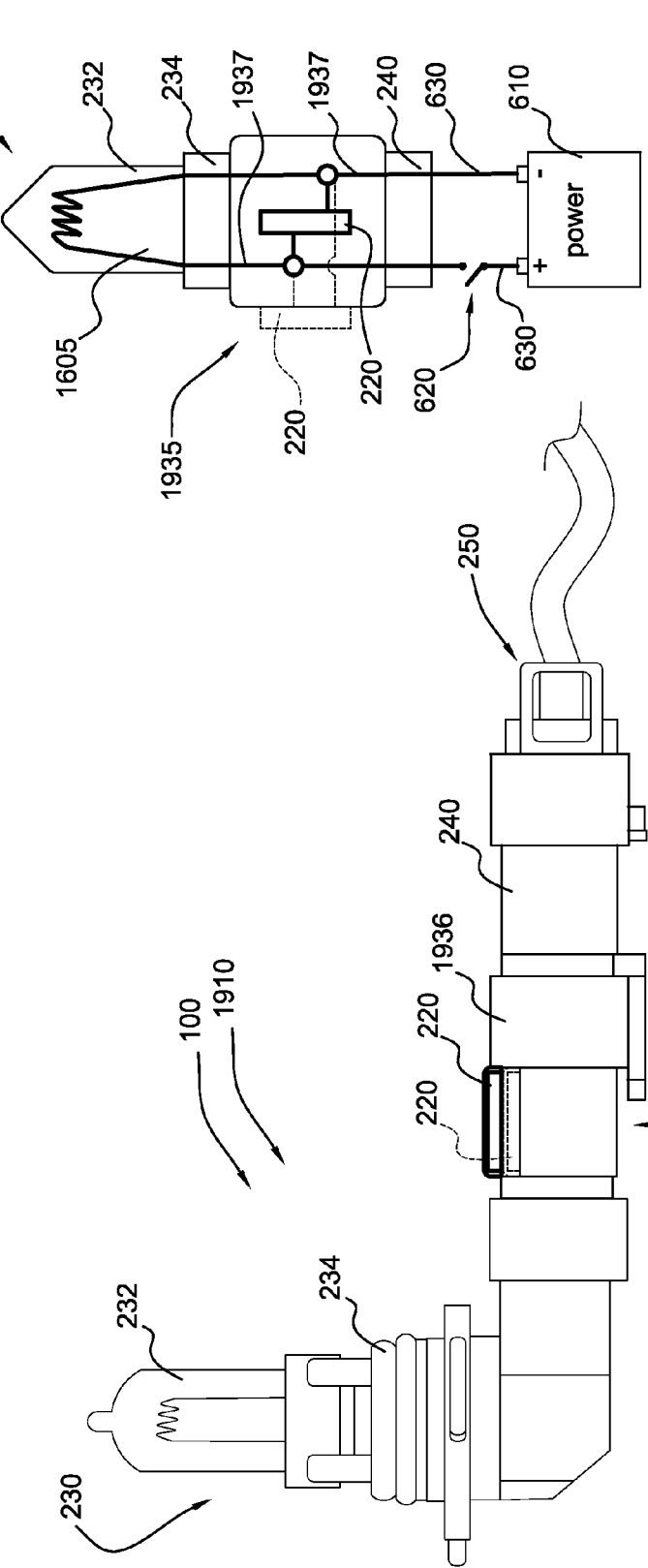
FIG. 19 shows a side view illustrating the remote control system according to a preferred embodiment of the present invention.
FIG. 20 shows a block diagram illustrating the remote control system according to the preferred embodiment of FIG. 19.

FIG. 19 shows a side view illustrating remote control system 100 according to a preferred embodiment of the present invention. Preferably, remote control system 100 comprises light assembly 1910 and transmitter 220, as shown. Preferably, light assembly 1910 comprises bulb assembly 230, transmitter adapter 1935, and socket 240, as shown. Upon reading the teachings of this specification, those with ordinary skill in the art will now understand that, under appropriate circumstances, considering such issues as advances in technology, user preference, etc., other arrangements, such as the transmitter adapter plugging in between the socket and the wiring harness, the transmitter being contained in other replaceable components such as the light circuit fuse, etc., may suffice.

Preferably, transmitter adapter 1935 comprises housing 1936, electrical connectors 1937 (as shown in FIG. 20), and transmitter 220 (at least embodying herein wherein such at least one adapter comprises such at least one transmitter; and at least embodying herein wherein such adapter means comprises such transmitter means), as shown. Preferably, transmitter adapter 1935 (at least embodying herein wherein such at least one electric light assembly further comprises at least one adapter structured and arranged to provide at least one adapter between such at least one bulb assembly and such at least one electrical socket; and at least embodying herein wherein such electric light assembly means further comprises adapter means for providing at least one adapter between such bulb assembly means and such electrical socket means) is structured and arranged to plug in between bulb assembly 230 and socket 240, as shown, and is structured and arranged to draw electricity from electrical connectors 1937 (at least embodying herein wherein such at least one transmitter is structured and arranged to draw electrical power from such at least one adapter; and at least embodying herein wherein such transmitter means is structured and arranged to draw electrical power from such adapter means; and at least embodying herein wherein such at least one plug-connected electrical component comprises at least one adapter; and at least embodying herein wherein such at least one plug-connected electrical component means comprises at least one adapter). Preferably, transmitter 220 is attached to the exterior of housing 1936, as shown. More preferably, transmitter 220 is placed (preferably manufactured) at least partially inside housing 1936 (as shown hidden).

FIG. 20 shows a block diagram illustrating the remote control system 100 according to the preferred embodiment of FIG. 19. Preferably, electrical connectors 1937 electrically connect bulb assembly 230 (at least embodying herein at least one bulb assembly structured and arranged to provide at least one assembled light bulb; and at least embodying herein bulb assembly means for providing at least one assembled light bulb) and socket 240 (at least embodying herein at least one electrical socket structured and arranged to provide at least one electrical socket structured and arranged to provide electrical power to such at least one bulb assembly; and electrical socket means for providing at least one electrical socket structured and arranged to provide electrical power to such bulb assembly means), as shown. Preferably, transmitter 220 (at least embodying herein at least one transmitter structured and arranged to transmit at least one coded radio frequency signal; and at least embodying herein transmitter means for transmitting at least one coded radio frequency signal) is electrically connected to electrical connectors 1937 in housing 1936, as shown.

FIG. 21 shows a block diagram illustrating remote control system 100 according to another preferred embodiment of the present invention. Preferably, remote control system 100 comprises fuse 2110 and transmitter 2120 (at least embodying herein at least one vehicle gate operator transmitter to transmit at least one coded radio frequency signal to remotely control operation of at least one vehicle gate), as shown. Preferably, transmitter 2120 is physically connected to fuse 2110, as shown in FIG. 23.

Preferably, fuse 2110 comprises a functional automobile fuse. Preferably, fuse 2110 comprises a standard blade-type fuse. Preferably, fuse 2110 is inserted in the electrical path between vehicle power supply 610 and light assembly 210 (preferably high-beam light 115), as shown (at least embodying herein wherein such at least one electrical light assembly comprises at least one high-beam electrical light assembly).

Preferably, transmitter 220 comprises transmitter 2120, as shown. Preferably, transmitter 2120 is electrically connected to fuse 2110, as shown. Preferably, transmitter 2120 is electrically connected to fuse 2110 via transformer 2205, as shown. Preferably, transmitter 2120 draws power from fuse 2110 when power is flowing through fuse 2110. Preferably, power flows through fuse 2110 when switch 620 is closed. Preferably, when power is applied to fuse 2110, transmitter 2120 is activated and transmits a brief, coded, RF signal 120 structured and arranged to trigger action by an RF receiver such as, for example, automatic garage door opener 130, as shown in FIG. 1. Preferably, transmitter 2120 is either pre-programmed or programmable to transmit a particular security code that matches the code of the receiver, including rolling security codes, as is further described in FIG. 9. Upon reading the teachings of this specification, those with ordinary skill in the art will now understand that, under appropriate circumstances, considering such issues as advances in technology, user preference, intended use, etc., other receivers, such as financial transaction code receivers such as toll road code receivers, other security codes, inventory codes, etc., may suffice.

FIG. 22 shows a front view illustrating remote control system 100 according to the preferred embodiment of FIG. 21.

Preferably, fuse 2110 (at least one automotive fuse) comprises housing 2111 (at least embodying herein at least one automotive fuse housing insertable into at least one electrical fuse-box socket of at least one vehicle) and blades 2113 (at least embodying herein at least one electrical contact blade), as shown. Preferably, fuse 2110 (at least embodying herein wherein such at least one plug-connected electrical component comprises at least one fuse) is plugged into fuse socket 2112 of vehicle, as shown. Preferably, fuse socket 2112 (at least embodying herein at least one electrical socket structured and arranged to provide electrical power to such at least one fuse) is electrically coupled to power supply 610, switch 620, electrical connections 630, and light assembly 210 (at least embodying herein at least one electric light assembly wherein such at least one electric light assembly comprises at least one fuse), as shown in FIG. 21.

Preferably, transmitter 2120 comprises power supply 2200, as shown. Preferably, power supply 2200 draws power from fuse 2110 when switch 620 is closed. Preferably, power supply 2200 comprises electrical transformer 2205, as shown. Preferably, transformer 2205 is inductively energized by power flowing through fuse 2210. Preferably, transmitter 2120 is designed to place transformer 2205 in physical proximity to fuse 2210, as shown. Preferably, transformer 2205 comprises at least one ferrite pot core transformer. Preferably, transformer 2205 comprises part number 0_40906EC manufactured by MAGNETICS of Pittsburgh, Pa. Upon reading the teachings of this specification, those with ordinary skill in the art will now understand that, under appropriate circumstances, considering such issues as advances in technology, user preference, etc., other power supplies, such as an inductor, a pulse transformer, a switch mode power supply, a battery, direct electrical connection to the fuse, etc., may suffice.

Figure 24:
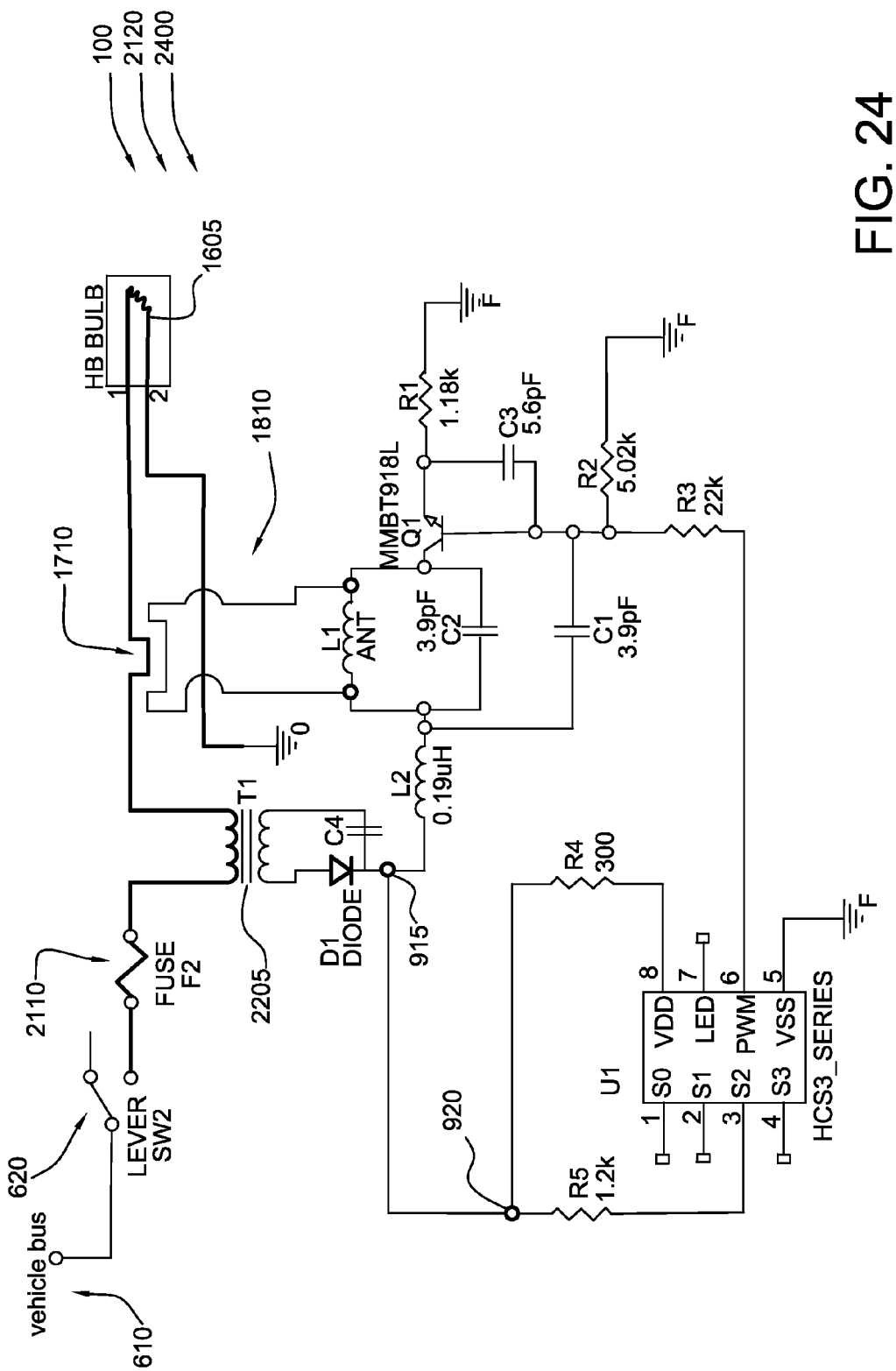
FIG. 24 shows a circuit diagram illustrating a preferred circuit for the preferred embodiment according to FIG. 21.

Preferably, transmitter 2120 comprises transmitter circuit 905, as shown. Preferably, transmitter circuit 905 is powered by power supply 2200, as shown in FIG. 24. Preferably, transmitter 2120 is assembled on circuit board 2217, as shown.

FIG. 23 shows a side view illustrating remote control system 100 according to the preferred embodiment of FIG. 21. Preferably, transmitter 2120 is physically permanently connected to fuse 2110, as shown. Preferably, transmitter 2120 is adhered to fuse 2110, as shown. Upon reading the teachings of this specification, those with ordinary skill in the art will now understand that, under appropriate circumstances, considering such issues as advances in technology, user preference, intended use, etc., other arrangements, such as the fuse and the transmitter being built into a single electrical housing, the transmitter being removably attachable to the fuse, etc., may suffice.

FIG. 24 shows a circuit diagram illustrating a preferred circuit 2400 for the preferred embodiment according to FIG. 21. Preferably, remote control system 100 comprises circuit 2400, as shown. Preferably, transmitter 2120 comprises circuit 2400, as shown. Preferably, circuit 2400 is substantially similar to circuit 1800 in FIG. 18, modified such that fuse 2110 and transmitter 2120 are electrically coupled via transformer 2205, as shown. Preferably, fuse 2110 uses ground 0 while transmitter 2120 uses floating ground F, as shown. Upon reading the teachings of this specification, those with ordinary skill in the art will now understand that, under appropriate circumstances, considering such issues as advances in technology, user preference, etc., other circuit components, such as visual indicators, audio indicators, heat sinks, independent power supplies, other transmitters, other receivers, etc., may suffice.

Figure 25:
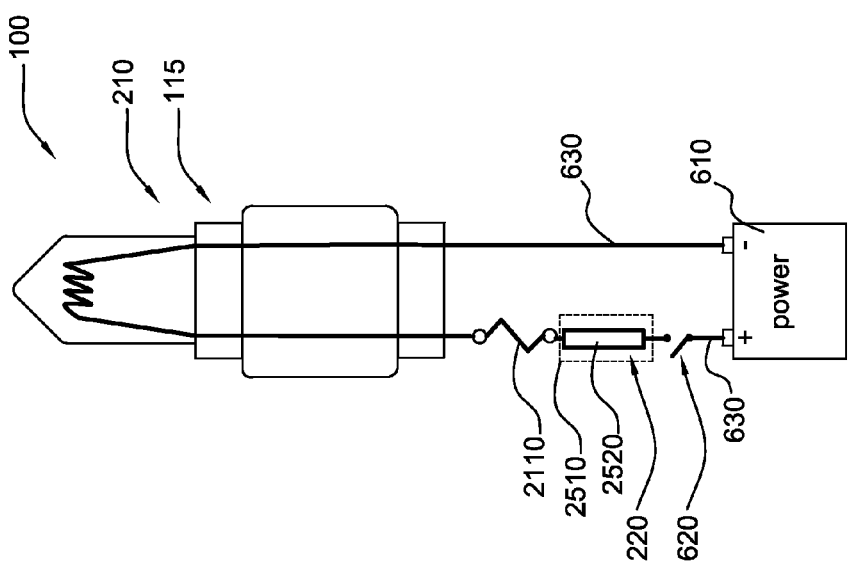
FIG. 25 shows a block diagram illustrating a remote control system according to another preferred embodiment of the present invention.

FIG. 25 shows a block diagram illustrating remote control system 100 according to another preferred embodiment of the present invention. Preferably, remote control system 100 comprises adapter 2510 and transmitter 2520, as shown. Preferably, adapter 2510 (at least embodying herein wherein such at least one adapter comprises such at least one transmitter) comprises transmitter 2520, as shown.

Figure 26:
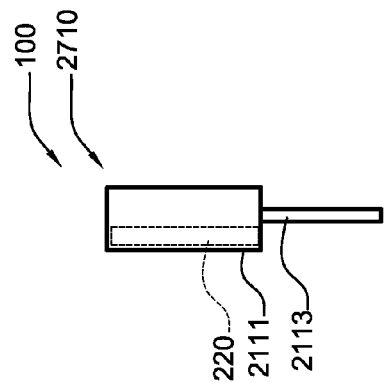
FIG. 26 shows a front view illustrating a remote control system according to the preferred embodiment of FIG. 25.

FIG. 26 shows a front view illustrating remote control system 100 according to the preferred embodiment of FIG. 25. Preferably, adapter 2510 permits fuse socket 2112 to be used as a vehicle remote control device while retaining the functionality of the electrical fuse required for safety.

Preferably, adapter 2510 physically and electrically connects transmitter 2520 to fuse socket 2112. Preferably, adapter 2510 is inserted into fuse socket 2112. Preferably, fuse 2110 is inserted into adapter 2510. Preferably, adapter 2510 passes power from fuse socket 2112 through to fuse 2110. Preferably, adapter 2510 is electrically connected to transmitter 2520. Preferably, adapter 2510 passes power from fuse socket 2112 to transmitter 2520 (at least embodying herein wherein such at least one transmitter is structured and arranged to draw electrical power from such at least one adapter).

Preferably, transmitter 220 comprises transmitter 2520, as shown. Preferably, transmitter 2520 (at least embodying herein wherein such at least one transmitter is structured and arranged to draw electrical power from such at least one electrical socket) is physically and electrically connected to adapter 2510, as shown. Preferably, transmitter 2520 draws power from adapter 2510 when power is flowing through adapter 2510. Preferably, power flows through adapter 2510 when switch 620 (at least embodying herein wherein such at least one electric light assembly comprises at least one transmitter structured and arranged to transmit at least one coded radio frequency signal) is closed. Preferably, when power is applied to adapter 2510, transmitter 2520 is activated and transmits a brief, coded, RF signal 120 (at least embodying herein wherein such at least one transmitter comprises at least one garage door remote control) structured and arranged to trigger action by an RF receiver such as, for example, automatic garage door opener 130, as shown in FIG. 1 (at least embodying herein wherein such at least one transmitter is triggered to transmit such at least one coded radio frequency signal by modulation of such electrical power supplied to such at least one electrical socket). Preferably, transmitter 2520 is either pre-programmed or programmable to transmit a particular security code that matches the code of the receiver (of a particular vehicle gate), including rolling security codes, as is further described in FIG. 9. Preferably, transmitter 2520 comprises transmitter circuit 905, as shown. Upon reading the teachings of this specification, those with ordinary skill in the art will now understand that, under appropriate circumstances, considering such issues as advances in technology, user preference, intended use, etc., other receivers, such as financial transaction code receivers such as toll road code receivers, other security codes, inventory codes, etc., may suffice.

Preferably, adapter 2510 is installed in vehicle 105 by removing fuse 2110 (preferably the fuse for the high-beam light circuit) from fuse socket 2112, plugging adapter 2510 into fuse socket 2112, and plugging fuse 2110 into adapter 2510 (at least embodying herein wherein such at least one electric light assembly further comprises at least one adapter structured and arranged to provide at least one adapter between such at least one fuse and such at least one electrical socket). In this way, a user may easily adapt their vehicle 105 to transmit a remote control signal 120 on demand, without any wire splicing being required, by replacing a part that is commonly intended to be user replaceable. Upon reading the teachings of this specification, those with ordinary skill in the art will now understand that, under appropriate circumstances, considering such issues as advances in technology, user preference, etc., other fuses to user-actuatable circuits, such as turn signals, radios, emergency flashers, fog lights, etc., may suffice.

Figure 27:
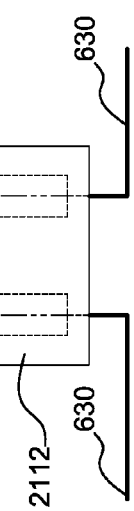
FIG. 27 shows a side view illustrating a remote control system according to another preferred embodiment of the present invention.

FIG. 27 shows a side view illustrating remote control system 100 according to another preferred embodiment of the present invention. Preferably, remote control system 100 comprises fuse 2710, as shown. Preferably, fuse 2710 (at least embodying herein wherein such at least one fuse comprises such at least one transmitter) comprises housing 2111, blades 2113, and transmitter 220, as shown. Preferably, transmitter 220 draws power from fuse 2710 (at least embodying herein wherein such at least one transmitter is structured and arranged to draw electrical power from such at least one fuse). Preferably, fuse 2710 is structured and arranged to be inserted into fuse socket 2210. Preferably, fuse 2710 comprises a functional automobile fuse. Preferably, fuse 2710 is installed in vehicle 105 by removing fuse 2110 (preferably the fuse for the high-beam light circuit) from fuse socket 2110 and plugging fuse 2710 into fuse socket 2110 (at least embodying herein wherein such step of replacing at least one plug-connected electrical component with at least one plug-connected electrical component comprising at least one radio frequency transmitter comprises the step of replacing at least one fuse with at least one fuse comprising at least one radio frequency transmitter). Preferably, fuse assemblies 2710 comprising transmitters 220 enable a user to easily adapt their vehicle 105 to transmit a remote control signal 120 on demand, without any wire splicing being required, by replacing a part that is commonly intended to be user replaceable. Upon reading the teachings of this specification, those with ordinary skill in the art will now understand that, under appropriate circumstances, considering such issues as advances in technology, user preference, intended use, etc., other arrangements, such as the fuse and the transmitter being built into a single electrical housing, the transmitter being removably attachable to the fuse, etc., may suffice.

With fuse 2710 installed in vehicle 105, vehicle 105 may be operated to remotely control a vehicle gate (garage door, gate, etc.). Preferably, vehicle 105 comprises at least two wheels. In one preferred embodiment, the preferred vehicle is a motorcycle. Preferably, vehicle 105 comprises at least four wheels. In another preferred embodiment, vehicle 105 is a car. Preferably, vehicle 105 comprises four or more wheels. In another preferred embodiment, the preferred vehicle is a truck.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A remote control system, relating to remote operation of at least one vehicle gate for at least one vehicle to drive through, comprising:
   a) at least one automotive fuse housing insertable into at least one electrical fuse-box socket of at least one vehicle;
   b) wherein said at least one automotive fuse housing comprises
      i) at least one vehicle gate operator transmitter to transmit at least one coded radio frequency signal to remotely control operation of at least one vehicle gate,
      ii) at least one automotive fuse, and
      iii) at least one electrical contact blade;
   c) wherein said at least one vehicle gate operator transmitter is structured and arranged to draw electrical power from said at least one automotive fuse when electrical power is applied to said at least one automotive fuse; and
   d) wherein said at least one vehicle gate operator transmitter is triggered to transmit such at least one coded radio frequency signal by modulation of electrical power supplied to said at least one automotive fuse.

2. The remote control system according to claim 1, further comprising at least one vehicle electric light circuit.

3. The remote control system according to claim 2, wherein said at least one automotive fuse is in electrical connection with said at least one vehicle electric light circuit.

4. The remote control system according to claim 3, wherein said at least one vehicle electric light circuit comprises at least one vehicle high-beam headlight circuit.

5. The remote control system according to claim 1, wherein said at least one vehicle gate operator transmitter is supplied to said at least one automotive fuse housing via at least one adapter element.

6. The remote control system according to claim 1, wherein said at least one automotive fuse housing comprises two electrical contact blades.

7. The remote control system according to claim 1, wherein said at least one vehicle gate operator transmitter remotely operates at least one garage door.

8. A method comprising the steps of:
   a) unplugging at least one automotive fuse from at least one electrical fuse-box socket of at least one vehicle;
   b) plugging at least one automotive fuse comprising at least one vehicle gate operator transmitter into such at least one electrical fuse-box socket; and
   c) triggering operation of such at least one vehicle gate operator transmitter by powering at least one electric light circuit of such at least one vehicle.

9. The method according to claim 8, further comprising the step of programming such at least one vehicle gate operator transmitter to operate with at least one particular vehicle gate.

10. The method according to claim 8, wherein such triggering step occurs in response to at least one pattern of powering such at least one electric light circuit of such at least one vehicle.

11. The method according to claim 8, wherein triggering operation of such at least one vehicle gate operator occurs by powering at least one vehicle high-beam headlight circuit.

12. A vehicle comprising:
   a) at least one automotive fuse connected with at least one electrical fuse-box socket of said vehicle;
   b) wherein said at least one automotive fuse comprises
      i) at least one vehicle gate operator transmitter to transmit at least one coded radio frequency signal to remotely control at least one vehicle gate,
      ii) at least one fuse, and
      iii) at least one electrical contact blade;
   c) wherein said at least one vehicle gate operator transmitter is structured and arranged to draw electrical power from said at least one automotive fuse when electrical power is applied to said at least one automotive fuse; and
   d) wherein said at least one vehicle gate operator transmitter is triggered to transmit such at least one coded radio frequency signal by modulation of electrical power supplied to said at least one automotive fuse.

13. The vehicle according to claim 12, wherein said at least one automotive fuse is in electrical connection with at least one vehicle electric light circuit.

14. The vehicle according to claim 13, wherein said at least one vehicle electric light circuit comprises at least one vehicle high-beam headlight circuit.

15. The vehicle according to claim 12, wherein said at least one vehicle gate operator transmitter is supplied to said at least one automotive fuse via at least one adapter element.

16. The vehicle according to claim 12, wherein said at least one automotive fuse comprises two electrical contact blades.

17. The vehicle according to claim 12, wherein said at least one vehicle gate operator transmitter remotely operates at least one garage door.

18. The vehicle according to claim 12, wherein said vehicle has at least two wheels.

19. The vehicle according to claim 12, wherein said vehicle has at least four wheels.

20. The vehicle according to claim 12, wherein said vehicle has four or more wheels.

* * * * *